United States Patent
Lynn et al.

[15] 3,667,523
[45] June 6, 1972

[54] APPARATUS AND PROCESS FOR THE REMOVAL OF THE GERM AND BRAN COAT FROM CEREAL GRAINS

[72] Inventors: Lawrence Lynn; John W. Hunnell, both of Houston, Tex.; Carl B. Leger, Kaplan, La.

[73] Assignee: Food Engineering International, Inc., Abbeville, La.

[22] Filed: Dec. 29, 1969

[21] Appl. No.: 888,219

[52] U.S. Cl............................................146/221.8, 146/255
[51] Int. Cl..............................................................B02b 3/08
[58] Field of Search................146/221.8, 255, 256, 292, 300, 146/305, 302, 253

[56] References Cited

UNITED STATES PATENTS 938,323  10/1909  Henry......................................146/256
3,330,666  7/1967  Wayne..........................146/221.8 X Primary Examiner—Willie G. Abercrombie
Attorney—Bertram H. Mann, Frank B. Pugsley, James G. Ulmer, Delmar L. Sroufe and Larry B. Feldcamp

[57] ABSTRACT

An improvement in apparatus and method for the removal of the seed coat, or bran layers, and the germ from cereal grains in the presence of a liquid. Said improvement in apparatus and method includes the provision, and use, of a vessel containing kernels of grain (preferably whole kernels) immersed in a liquid medium, and means for moving a member such as a blade or bar rapidly through the liquid medium and preferably at a velocity relative to said medium in excess of 10 feet per second to cause an impacting face of said movable member to strike against the kernels of cereal grain in said liquid to detach the seed coat and germ from said kernels.

12 Claims, 5 Drawing Figures

LAWRENCE LYNN
JOHN W. HUNNELL
CARL B. LEGER
INVENTORS.

BY Delmar L. Stroufe

ATTORNEY

APPARATUS AND PROCESS FOR THE REMOVAL OF THE GERM AND BRAN COAT FROM CEREAL GRAINS

BACKGROUND OF THE INVENTION

1. Field of The Invention

This invention relates to methods for removing the seed coat or bran layers and the germ from cereal grains, such as, wheat, oats, rice, barley, rye, millet, and grain sorghums.

Apparatus and methods for the milling of cereal grains, particularly rice, to remove the seed coat or bran layers in the presence of a liquid are disclosed and claimed in patents such as U.S. Pat. Nos. 3,217,769 and 3,261,690 of Truman B. Wayne Japanese Patent No. 116,917, publication No. 1806 of 1936, discloses a process for removing bran layers from rice by violently agitating a suspension of brown rice for a prolonged period of time.

The term "milling" is used in the discussion of the process of the present invention to refer to cleaning kernels of grain and removing bran layers therefrom in the same manner as said term is used in the rice industry and as the term is used in the aforesaid U.S. Pat. No. 3,217,769.

In the Wayne processes, as well as conventional methods of milling rice, barley and millet, it is a primary object to remove the bran layers in such manner as to retain the whole grain because the economic value of unbroken, clean cereal grains, particularly rice, is substantially more than the value of broken grain rice. The Japanese patent relates to a method of removing bran layers from rice by agitation in order to avoid excessive abrasion, or wearing, of the grain to retain the maximum yield of the rice grain for brewing Sake (rice wine).

The present invention relates to improved apparatus and methods for such seed coat or bran removal from whole kernels of grain (as used herein, whole kernels includes whole, substantially whole, or mixtures of whole and broken units of grain kernels which have the bran or seed coat attached but which are preferably substantially free of the outer husk of the grain) to produce higher yields of clean, preferably unbroken, grain than may be achieved by any prior art apparatus or method for dry milling or for milling in the presence of a liquid.

2. Prior Art

The milling of cereal grain in the presence of a liquid has been accomplished in the past by apparatus having a milling rotor located within a sleeve or wire mesh screen. In such prior art liquid milling process employing a rotor and screen, the grain is subjected to pressure within the milling chamber surrounded by the perforate screen. Although the cushioning effect of the liquid medium results in an improvement in yield of unbroken, clean grain compared with dry milling processes, there is nevertheless a substantial breakage of grain kernels as the result of the pressure imposed upon the grain in the milling chamber and by abrasion resulting from contact with the aforementioned screen.

It has been suggested in the Japanese Patent No. 116,917 that violent agitation of the cereal grain would achieve milling, but attempts to adapt the process of this patent to the removal of bran layers or seed coats from kernels of cereal grain have not been successful because violent agitation of the grain in a liquid media is inefficient in its removal of the bran coat and requires an inordinate amount of time. The inefficiency of such a process results in problems of incomplete removal of the bran layer or seed coat, or excessive broken grains, depending upon the type of apparatus used to provide violent agitation.

SUMMARY OF THE INVENTION

A primary object of this invention is to provide improved milling apparatus for the milling of cereal grains in the presence of a liquid.

A further object of this invention is to provide an improved milling means and process for the milling of cereal grains in the presence of a liquid with higher yields of unbroken, clean grain than can be obtained by conventional milling means.

The foregoing objects are achieved in accordance with this invention by providing a vessel in which whole kernels of grain are immersed in a liquid, and subjecting the immersed kernels of cereal grain to repeated impact blows by a side or edge of a solid member passing through said liquid medium at a relative velocity with respect to said medium in excess of 10 feet per second. Although fairly thick bars or blades exceeding one-half inch in thickness of the impacting face may be used as the solid member to achieve some milling, the efficiency of milling is considerably enhanced by using a relatively thin impacting face of about one-half inch thickness or less, and an impacting face of about one-eighth thickness or less is preferred.

It should be recognized that the movement of the solid member through the liquid as discussed herein refers to relative motion and whether the blade or the liquid, or both, are caused to move is not important so long as relative motion is achieved. Further the term "relative velocity" of the solid member means the rate of motion, or the speed, of the member at any instant with respect to the liquid medium.

BRIEF DESCRIPTION OF THE DRAWINGS

Turning now to the drawings.

DESCRIPTION OF THE PREFERRED EMBODIMENTS

Figure 1:
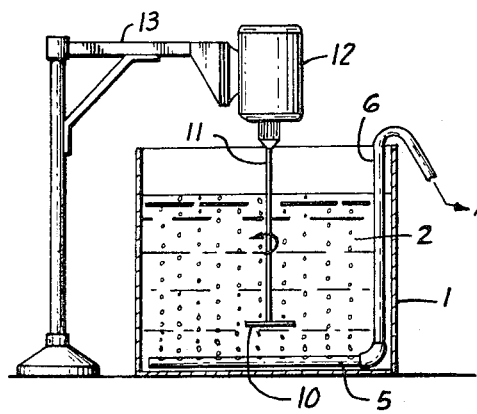
FIG. 1 is a schematic representation of apparatus embodying the present invention.

Suitable apparatus for the practice of this invention is illustrated in FIG. 1. The vessel 1 for the liquid and immersed grain (indicated generally by the number 2) may be provided with means for suspending the grain in the liquid medium such as an air or gas sparger 5 connected to a source of gas or air (not shown) by line 6. The suspending means while beneficial in large vessels may be omitted if desired since dispersion of the grain in the liquid medium sufficient for the practice of this invention will result from movement of the impacting means through the immersed grain kernels.

Mounted within the vessel 1 is an impacting member such as 10 or 35 which is affixed to a supporting member such as rotating shaft 11 driven by a power means, such as motor 12 suspended by any suitable means such as the bracket 13. A compatible liquid medium together with whole kernels of cereal grain is placed in vessel 1.

Figure 2:
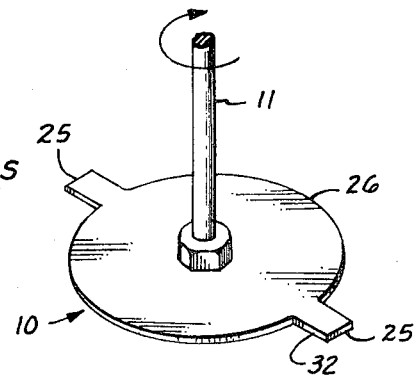
FIG. 2 is an axiometric projection of an impacting blade used as an impacting member in the practice of the present invention.
Figure 5:
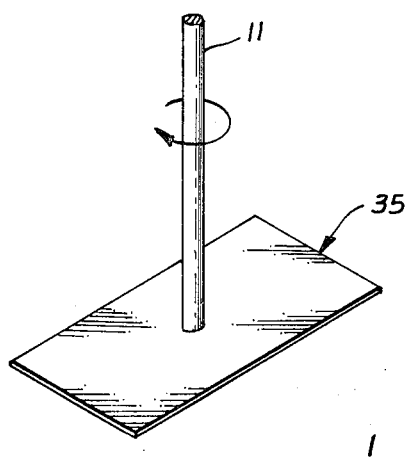
FIG. 5 is an axiometric projection of another form of impacting means which may be used in the practice of the present invention.

It should be recognized that a configuration for the impacting member such as that shown in FIG. 5 as is fully desirable for commercial use as the member of FIG. 2 which was designed to provide an impacting surface with minimum variation in relative velocity over the entire leading face. It is presently preferred that the body of the impacting means be substantially flat and that it be disposed at an attitude such that it will pass through the liquid medium without itself producing any substantial agitation. However, it is recognized that other configurations of impacting face and blade design may be used without departing from this invention. For example, mild agitation of the liquid and suspended grain can be achieved by suitable alterations in the blade design in order to maintain the grain kernels in suspension. However, any configuration having a substantial blade angle must be avoided because such configurations produce excessive agitation and cannot be used for efficient milling.

It should be noted that the use of rotating impacting means is not essential to the practice of the present invention since other means such as oscillating impacting heads may be used to cause a side or face of the impacting member to strike suspended kernels of grain at the required velocity for seed coat removal.

Impacting elements fabricated from materials other than metal have been tested and have generally been found to be effective milling devices. Any solid member may be used. However, the impacting member must have sufficient strength to maintain its integrity and it has been observed that the tested materials other than metal, such as plastic materials, tend to wear away much more rapidly than metal impacting heads fabricated from stainless steel or other hard metal materials.

The liquid media, or menstruum, supplied to the interior chamber of vessel 1 may be any suitable liquid which is compatible with the grain to be processed. The presence of a liquid medium in sufficient amount to suspend the grain with mild agitation is all that is important to the practice of this invention; however, as is known in the rice milling arts, some liquids, such as liquids containing an excess of water over that required to maintain the moisture content of the grain, will damage the quality of the rice and may reduce the yield of unbroken clean kernels.

Liquid, or liquid mixture, for processing rice to produce a whole grain product should be selected or adjusted to avoid hydration or dehydration of the endosperm of the kernel. Preferably the liquid should be a solvent for the rice oil, but the practice of the invention is not restricted to solvents. Polar and non-polar solvents, aqueous solutions such as sugar solutions, glycols, acids and alkalies, vegetable oils, etc. have all been successfully used in the practice of the present invention. Hydrocarbon solvents such as normal hexane or other low-boiling petroleum fractions; vegetable oil-solvent miscellas (which are presently preferred) glycols, for example propylene glycol; oxygenated solvents, including ketones, such as acetone, (preferably acetone should be used with water in proportions to provide an aqueous balance with the moisture in the grain to avoid hydration or dehydration of the endosperm); ethanol and water; esters; and the like.

In the operation of the apparatus of this invention, liquid such as hexane and the grain kernels to be processed are supplied to the vessel 1 by any suitable means. Within vessel 1, the grain is caused to be dispersed throughout the liquid by mild agitation. If the vessel size is such that more agitation is desired than provided by the impacting means, mild agitation may be achieved by means such as bubbling air or gas from sparger 5. The impacting means 10 is caused to pass through the liquid medium at a velocity in excess of 10 feet per second by any suitable means such as rotating shaft 11. The impacting of the cereal grain is continued for a suitable period of time, usually about one hour or less until the seed coat or bran layer has been substantially or fully removed as desired. For any particular grain, the extent of milling and the extent of breakage can be checked from time to time by dipping a small sample from the suspension in vessel 1 for visual inspection.

When the bran layer or seed coat has been removed from the grain, the motor 12 is turned off and the air or gas flow through line 6 is discontinued. The mixture of rice, bran, germ and liquid phase are discharged from the vessel and passed to conventional separating and desolventizing equipment. Such equipment is well known in the art and is not shown since any suitable means of isolating the grain and removing portions of bran or seed coat therefrom may be used to complete the processing of the grain after detaching the bran or seed coat in accordance with the present invention.

Likewise, the separation of bran, germ, and oil from the liquid media is well known in the art and is not shown here since any conventional means for conducting these steps may be used for the further processing of the bran, germ and oil in the liquid media discharged from vessel 1 of the present invention.

CONFIGURATION AND SIZE OF IMPACTING MEANS

EXAMPLE 1

A number of tests have been conducted in order to determine the effect of the shape of the impacting means, its thickness, and the speed of impact. Although many different configurations may be used, most of the tests were conducted with an impacting head such as that illustrated in FIG. 2 attached to a rotating shaft. For test purposes, this design provided an impacting surface with minimum variation in the velocity for the entire leading edge or impacting face of blades 25 projecting from disc 26 at any given speed of rotation of the shaft 11.

In a number of milling tests using impacting members having the configuration shown in FIG. 2, the thickness of the impacting member was varied from 0.018 inches to 1.50 inches. Each blade 25 projected approximately three-eighths inches from the circular disc 26 which was about 2 ¼ inches in diameter. For each of these tests a circular vessel about 6 inches in diameter and 7 inches deep was used. Three hundred grams of rice was immersed in 800 cc of a 50—50 rice oil-hexane miscella. Test runs were conducted at 26.5 feet per second blade velocity (at mid point of the impacting surface) and each run was of 1 hour duration. The results are set forth in Table I below.

TABLE I

| Blade Thickness | % of Total Bran Removed |
| --- | --- |
| 0.018" | 99.0 |
| 0.0625" | 78.8 |
| 0.125" | 55.0 |
| 0.25" | 30.0 |
| 0.50" | 18.8 |
| 0.75 | 18.0 |
| 1.0 | 17.9 |
| 1.25 | 18.1 |
| 1.50 | 18.0 |

The data in Table I show that the impacting member should be as thin as possible. However it should be sufficiently thick to provide the desired rigidity. Thicknesses of 0.5 inches or even higher give some milling but preferably the blade should be below about 0.25 inch thickness, and most desirably below about 0.125 inch thickness.

EXAMPLE 2

Figure 3:
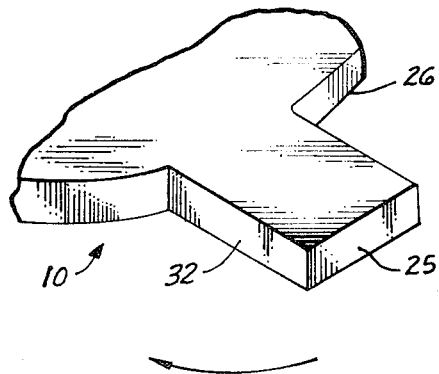
FIG. 3 is an axiometric projection of a cut-away portion of the impacting means illustrated in FIG. 2.
Figure 4:
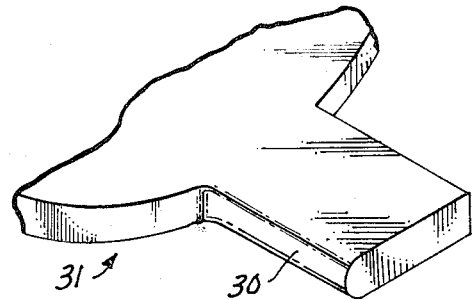
FIG. 4 is an axiometric projection of a cut-away portion of another form of impacting means which may be used in the practice of the present invention.

It has been found that the shape of the impacting face when moved at a suitable velocity to remove the bran layer, is not critical. For example, tests of the blade design of FIG. 4 showed that the rounded leading edge 30 of the impacting member 31 of FIG. 4 was effective in milling rice even though it was not as effective as the flat face 32 of the impacting member 10 of FIG. 2 and FIG. 3. In tests conducted at the same speed of rotation, with the same average blade velocity, as used in the tests in Table I above upon a sample of the same rice, the resultant milling is summarized as follows:

TABLE II

Conditions:
450 grams pure rice oil
300 grams rice
1 hour milling time
26.5 ft/sec speed
(1)   0.062 inch blade thickness
   Rounded edge — 288.4 grams rice after milling; 11.6 grams bran removal.
   Square edge — 286.0 grams rice after milling; 14 grams bran removal.
(2)   0.125 inch blade thickness
   Rounded edge — 294.0 grams rice after milling; 6 grams bran removal.

Square edge — 291.0 grams rice after milling; 9 grams bran removal.

EXAMPLE 3

Other blade configurations such as blade 35 illustrated in FIG. 5 have been used. It is believed that a configuration such as the blade 35 of FIG. 5 is fully as desirable for commercial use as the impacting member of FIG. 2 which was designed primarily for test purposes to provide an impacting surface with minimum variation in velocity over the entire leading face. In one test of the impacting member 35, 150 grams of brown rice was suspended in 225 grams of a solution consisting of 90 parts acetone and 10 parts water in a glass vessel. The impacting member 35 was 2 inches by 1 ⅛ inches in major dimensions and it was fabricated from 24 gauge stainless steel. It was mounted horizontally on a 1 ¼ inch stainless steel rod and rotated at 1,600 RPM for a period of 2 hours. The added brokens were 2.4 percent and the yield of clean rice was 137.4 grams. The rice was milled to an equivalent of at least a U.S.D.A. grade 2 milled rice. (This is suitable quality of U. S. packaged rice.)

EXAMPLE 4

An attempt was made to mill another sample of the rice used in Example 2 using a marine type impeller under the same test conditions and procedures as set forth in Example 3. The marine type propeller was approximately 3 inches in diameter and had sufficient angular tilt to the blades to provide violent agitation. It was impossible to maintain the rice and liquid in the container at rotational speeds above 1,000 RPM. However a test run with the marine impeller at this speed for a period of 3 hours resulted in incomplete milling with only about 50 percent of the bran removed and 5 percent broken grains were added by this treatment.

EXAMPLE 5

Two identical impacting members having one-eighth inch thickness and the configuration shown in FIG. 2 were mounted three-fourths of an inch apart on a single shaft 11. Three hundred grams of brown rice was suspended in 800 grams of a 50/50 rice/hexane miscella in a circular vessel of about 5 inch diameter. The two blades were rotated for 20 minutes at 1,800 RPM to give an impact velocity of about 26.5 feet per second. Seventy-one percent of the bran was removed. A comparative test using only one blade under the same conditions for a 20 minute run resulted in the removal of only 48 percent of the bran.

EFFECT OF IMPACT VELOCITY

EXAMPLE 6

Two impacting members having the configuration shown in FIG. 2, respectively 0.018 inches thick and 0.06 inches thick were used in bran removal tests for a number of aliquot portions of a representative lot of brown rice. Each aliquot sample was processed in apparatus as illustrated in FIG. 1 at an impacting velocity which was varied from 7.4 feet per second to 71.5 feet per second by controlling the speed of rotation of shaft 11. The results in degree of milling and percentage of broken grains is summarized in Table VI below.

TABLE VI

Milling Conditions:
  Medium: 50% rice oil - 50% hexane
  Time: 1 hour
  Ratio of medium to rice: 1.5/1.0 by weight

| Speed Ft./Sec. | Total Bran Removed As % of Bran Present | | Brokens % added | |
|---|---|---|---|---|
| | .018" Blade | .06" Blade | .018" Blade | .06" Blade |
| 7.4 | 0 | 13.6 | 0.5 | 0.6 |
| 11.7 | 57.3 | 51.3 | 0.6 | 0.6 |
| 17.8 | 73.7 | 67.7 | 1.8 | 2.4 |
| 20.8 | 83.0 | 76.3 | 4.1 | 4.3 |
| 26.5 | 96.3 | 90.7 | 7.2 | 7.5 |
| 29.5 | 100 | 100 | 8.5 | 9.6 |
| 44.5 | 100 | 100 | 23.2 | 37.9 |
| 59.0 | 100 | 100 | 61.2 | 64.2 |
| 71.5 | 100 | 100 | 99.5 | 72.6 |

From the foregoing it is apparent that no substantial milling was achieved below an impact velocity of approximately 10 feet per second. At this velocity milling is achieved at a reasonable rate and the degree of milling is increased with increased velocity.

As may be noted from Table VI above, the percentage of broken grains was in excess of 5 percent at velocities above about 25 feet per second, and above 40 feet per second the added brokens increases rapidly with increased velocity of impact. However, all bran had been removed at 29.5 feet per second and, obviously less time could be used to reduce the brokens at higher speeds. For the greatest economic benefit of the use of applicants' invention, it is desirable that the grain be sold as substantially unbroken, clean grain, and to achieve the maximum yield of unbroken, clean grains of rice, the impacting member should be passed through the liquid medium at a velocity between 10 feet per second and about 40 feet per second, and preferably between 15 feet per second and 30 feet per second.

However, there are commercial uses for clean grain for which the amount of broken grain is immaterial. For such grain the velocity of the impacting means may be varied as desired above 10 feet per second. Such commercial uses of broken clean grain include rice and other grains used for brewing; grain used in the production of flour and grain used for various starch and syrup products. For any such uses, the removal of the bran or seed coat layer at relatively high speeds, well in excess of 40 feet per second, offers the advantage of exceedingly rapid removal of the bran or seed coat layer.

EXAMPLE 7

Effect of Viscosity of Liquid Medium

A series of tests was conducted using the apparatus of Example 1 above with a one-sixteenth inch thick blade as shown in FIG. 2 and with a speed of impact maintained for 1 hour at approximately 26.5 feet per second. To avoid volume effects, a total grain and liquid volume of 700 ml was used with 300 grams of rice for each test. Aliquot portions of a single lot of rice were tested in various liquid media having viscosities ranging from 0.50 centipoises to 61.3 centipoises. The results of these tests are summarized in Table VII below.

TABLE VII

| Medium | Viscosity In Centipoise | % Total Bran Removal | % Brokens Added |
|---|---|---|---|
| 100% rice oil/0% hexane | 55.9 | 91.7 | 3.0 |
| 80% rice oil 20% hexane | 10.2 | 90.7 | 3.6 |
| 60% oil/40% hexane | 3.1 | 81.6 | 3.5 |
| 40% oil/60% hexane | 1.3 | 85.0 | 3.6 |
| 20% oil/80% hexane | 0.72 | 82.3 | 3.8 |
| 0% oil/100% hexane | 0.50 | 95.0 | 4.1 |

It has been concluded that there is no limiting criticality in the viscosity of the liquid medium with respect to either bran removal or added brokens.

DISCUSSION

Various agitating means have been used to determine whether conventional agitator elements could be used to achieve the results of the present invention. It was found that violent agitation by shaking means (such as paint can shakers); air jet agitators and paddle wheel agitators were not capable of detaching the bran or seed coat layer from cereal grains. Conventional marine impeller type agitators have been tested as described in Example 4 and it has been found that by rotating such agitators at high speed, some milling can be achieved on the order of 50 percent bran removal. However, with 3 hours milling at very violent agitation the marine propeller achieved only partial removal of bran with substantially higher brokens than resulted with 90 percent bran removal using the impacting means of this invention.

The test procedure under conditions set forth in Example 7 above was used with only a single grain of rice suspended in 700 ml of a 50:50 hexane-rice oil miscella, and the impacting means was rotated to provide an impact velocity of 26.5 feet per second. It was found that the bran coat layer was removed from this single grain of rice in about 2 hours, showing that the presence of other grains in the suspension is not necessary to achieve the effect of the present invention. It is believed that milling of rice is accomplished in the present invention by multiplicity of hits by the impacting face of the impacting means on each kernel of grain as it randomly circulates in the vessel in a cushioned impact environment.

Suspension of the grain in the liquid is desired but is not essential since the movement of the impacting member through submerged grain can be used and normally results in the desired dispersion of the grain. The process may be operated in batches or it may readily be adapted to continuously handle quantities of grain and liquid medium into the chamber in which the impacting means is provided and a continuous discharge means for the removal of the grain.

Laboratory tests have been described in which various rates of bran of seed coat removal have been achieved. Actually, it has been found that brown rice can readily be milled to any desired degree of milling in 30 minutes or less by using multiple impacting head units (which may be any desired number) and this milling time is not considered to be the minimum achievable time.

Data in this application have been generally related to the percent of bran removed from the grain as determined by the decrease in bran weight from total bran content of the brown rice. It must be recognized that the grading of cereal grains, particularly rice, is not an exact science. In the trade U.S.D.A. grades ranging from 1 to 5 are commonly used. For comparative purposes data shown herein relating to the percent of bran removed may be considered to be approximately as follows:

| | |
|---|---|
| 90% bran removal | approximately equivalent to a number 2 or better U.S.D.A. grade |
| 85% bran removal | approximately equivalent to a number 3 U.S.D.A. grade |
| 80% bran removal | approximately equivalent to a number 4 U.S.D.A. grade, and |
| 70% bran removal | approximately equivalent to a number 5 U.S.D.A. grade. |

When the product of the present invention has been graded by persons skilled in the art, it has been found that rice which under the test conditions set forth in the above examples had 90 percent of the bran removed would be commercially acceptable for package quality rice for U. S. consumer trade. Such rice was judged to be at least No. 2 U.S.D.A. grade.

We claim:

1. An improved process for removing the bran coat from cereal grains comprising immersing in a liquid medium whole kernels of cereal grain, said kernels being substantially free of outer husks, passing a solid impacting member through said liquid medium and through said immersed grain at a velocity in excess of 10 feet per second relative to said liquid medium, said impacting member having an impacting face not more than one-half inch thick on its forward side with respect to its motion through said liquid, and continuing the passage of said impacting member through said liquid to cause repeated impact of said impacting member upon said kernels of cereal grain to remove bran therefrom.

2. The process of claim 1 in which said cereal grain is brown rice.

3. The process of claim 1 in which said impacting member is passed through said liquid medium at a liquid linear velocity between 10 feet per second and 40 feet per second.

4. The process of claim 1 in which said impacting member is passed through said liquid medium and grain at a linear velocity between 15 feet per second and 30 feet per second.

5. The process of claim 1 in which said liquid medium has a viscosity from about 0.50 to about 56 centipoises.

6. The method of claim 1 in which said liquid media is a vegetable oil miscella in a low-boiling hydrocarbon fraction.

7. Apparatus for removing the bran and germ from cereal grains comprising a vessel containing a liquid and immersed in said liquid whole grain kernels which are substantially free of outer husks, means for moving a solid member through said liquid in a forward direction at a velocity in excess of ten feet per second, said solid impacting member having at least one relatively thin impacting face of less than about 0.5 inches thickness disposed on the side of said member facing said forward direction.

8. The apparatus of claim 7 in which said impacting face has a thickness less than about 0.25 inches.

9. The apparatus of claim 7 in which said impacting face has a thickness of about 0.125 inches or less.

10. The apparatus of claim 7 in which said impacting member is a flat blade.

11. The apparatus of claim 10 in which said blade is mounted on a rotatable shaft and said blade is disposed in a plane perpendicular to the axis of said shaft.

12. The apparatus of claim 7 further characterized by means for suspending said kernels of grain in said liquid.

* * * * *

UNITED STATES PATENT OFFICE
CERTIFICATE OF CORRECTION

Patent No. 3,667,523     Dated June 6, 1972

Inventor(s) Lawrence Lynn; John W. Hunnell; Carl B. Leger

It is certified that error appears in the above-identified patent and that said Letters Patent are hereby corrected as shown below:

Column 1, line 13, a period should be placed after "Wayne"

Column 1, line 60, "in", first appearance, should be -- is --

Column 2, line 57, "as is" should be -- is as --

Column 5, line 20, "of" should read -- for --

Column 7, line 29, after "quantities of grain", the following part of the sentence was omitted -- by providing suitable flow means to introduce the grain --

Signed and sealed this 29th day of August 1972.

(SEAL)
Attest:

EDWARD M. FLETCHER, JR.
Attesting Officer

ROBERT GOTTSCHALK
Commissioner of Patents